(No Model.)

J. T. PHELAN.
HEDGE TRIMMER.

No. 508,749. Patented Nov. 14, 1893.

WITNESSES:
Chas. H. La Porte.
Harry A. Cull.

INVENTOR
John T. Phelan
BY Hurst Gunnell
His ATTORNEYS.

UNITED STATES PATENT OFFICE.

JOHN T. PHELAN, OF NEW LONDON, MISSOURI.

HEDGE-TRIMMER.

SPECIFICATION forming part of Letters Patent No. 508,749, dated November 14, 1893.

Application filed October 26, 1892. Serial No. 450,058. (No model.)

*To all whom it may concern:*

Be it known that I, JOHN T. PHELAN, a citizen of the United States, residing at New London, in the county of Ralls and State of Missouri, have invented certain new and useful Improvements in Hedge-Trimmers; and I do hereby declare the following to be a full, clear, and exact description of the invention, such as will enable others skilled in the art to which it appertains to make and use the same.

My invention relates to certain new and useful improvements in cultivators of that type which are adapted for cutting or trimming the side roots of hedges and for clearing ground of roots and the like, and it consists in certain novel constructions, combinations and arrangements of parts as will be hereinafter described and claimed.

Figure 1:
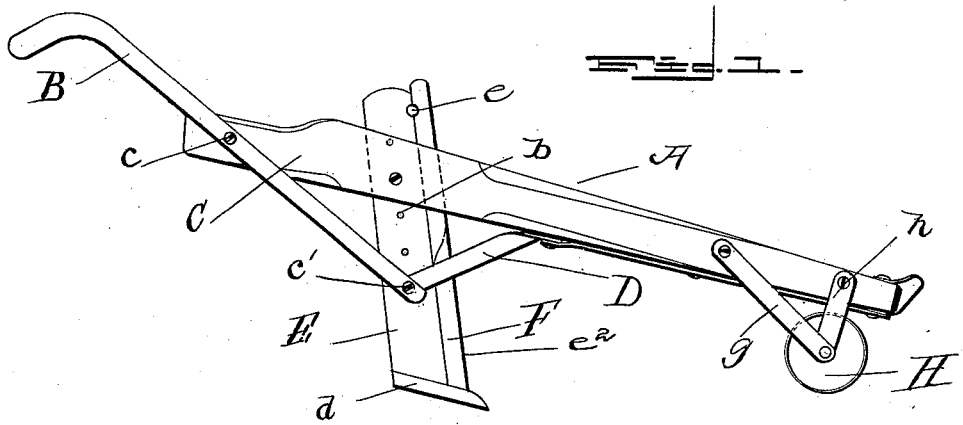
Figure 2:
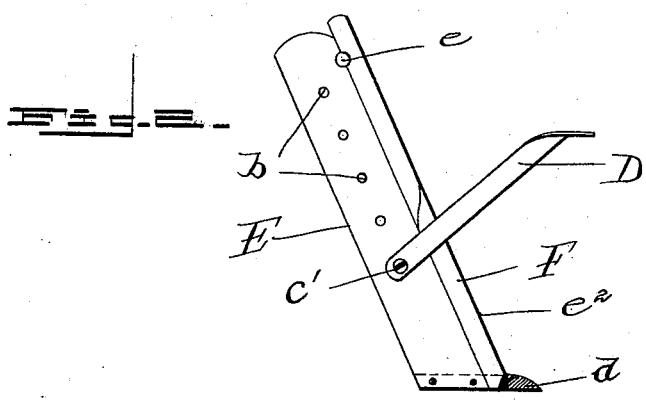
Figure 3:
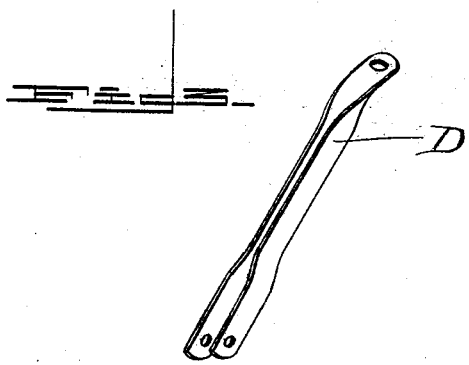

In the accompanying drawings, Figure 1 is a side elevation of my improved cultivator. Fig. 2 is a detail view of the standard and cutter blade and the shoe into which the lower ends of said standard and blade fit, said shoe being in partial section, and Fig. 3 is a perspective view of a novel construction of brace.

A in the drawings represents the cultivator which is provided with ordinary plow handles B, which latter are secured to the beam C at $c$ and to the brace D and standard E at $c'$ by means of pins or bolts. The lower end of the standard E rests in a socket formed in the shoe $d$ and is fastened thereto in any suitable manner, and from thence it passes up through a diagonally running recess formed in the beam and through it to a desired height. This standard is provided with holes $b$ punched or drilled through it at regular intervals by which it may be adjusted vertically to any desired point, the standard being secured to the beam B by a pin or bolt passed through the beam and one of said holes. Forward of the standard and connected thereto is a cutter bar or blade F which is firmly yet removably secured to the shoe $d$ at its lower end by cutting away a portion of its front face to form a shoulder which overlaps a part of the toe portion of the shoe, said end being cut or planed off diagonally to conform to the shape and set of the shoe and the standard. This cutter bar is secured to the standard by a pin $e$ entering depressions or slots formed in the standard and cutter bar, as shown in Fig. 2; or it may be secured to said standard by lips or lugs $e'$ formed on the cutter bar and entering sockets in the standard adapted to receive the same. At a point just above or near the junction of the cutter bar with the brace D, and on its forward edge, it is beveled or planed off to form a sharp blade $e^2$ which is adapted to cut or lop off roots or the like at or near the surface of the ground, or underneath the same, as is apparent.

Attached to the under surface of the beam is the brace D which, for convenience of attachment, is flattened at the point where it is secured to the said beam and from said point bulging out a short distance and then narrowing and forming a groove or channel-way of great strength and rigidity, until it meets the front surface of the cutter blade, where it is split or crotched, the outer ends of said crotch having holes which register with a similar hole in the brace bar, and through which a fastening bolt or pin is passed, the said brace by reason of its great strength and rigidity serving to overcome all draft strain and to prevent sidewise movement and breaking of the cutter blade when under the strain of cutting a root. The shoe $d$ has its toe part beveled off to form a cutting portion which is adapted to serve a double purpose, namely, to open a way for the lower cutter blade portion, and as a means for assisting in the cutting operation, the said toe portion being adapted when striking a root to cut it through or part way through so that the more delicate cutter blade will be enabled to lop off the partially cut root without trouble or danger of breakage. The shoe may be formed, as shown, with an opening in its middle running from front to rear and from bottom to top and with its rear end open; or with a groove or socket closed at bottom and sides or the shoe and standard made of a homogeneous piece of metal and a socket provided for the reception of the toe piece of the cutter bar or blade. At the forward end of the beam, I provide a wheel H, supported by the braces $g$ and $h$ through which, at their junction ends, a shaft or axle is passed upon which the wheel runs.

As stated, the shoe of the cultivator is beveled to form a cutting edge upon its front surface and is pointed and downwardly or diagonally inclined so as to aid the cutter blade in readily effecting the cutting of the roots. It will also be seen that the cutter bar or blade is constructed of steel, and that the other parts of the cultivator are made of material suitable to their needs.

By means of the parts shown, the cutter blade and the shoe, whenever dull or broken, may be removed from the cultivator and sharpened or renewed wholly.

What I claim as my invention is—

1. The combination with a plowbeam, of a standard having a toe or mole, an independent cutter on the front edge of the standard and secured to the mole, and a brace comprising in its construction a flattened portion which is adapted to be attached to a beam, a central grooved or channeled portion and a crotched portion having members adapted to embrace a standard, one on each side thereof, substantially as described.

2. In a hedge trimmer, the combination with a beam, of a bracing standard, a vertical cutter bar, the said cutter bar and standard having their lower surfaces diagonally planed off, a shoe into which the standard and cutter bar fit which has its toe portion on a plane lower than its heel or rear portion, and a brace having a flat beam attaching portion, a central channeled portion and a crotched portion, the members of said latter portion embracing the standard and cutter bar, one on each side thereof, substantially as described.

In testimony whereof I hereunto affix my signature in presence of two witnesses.

JOHN T. PHELAN.

Witnesses:
J. W. HAYS,
CHAS. A. JONES.